United States Patent
Topper

Patent Number: 4,683,498
Date of Patent: Jul. 28, 1987

[54] COMPATIBLE WIDE-SCREEN TELEVISION SYSTEM CAMERA

[75] Inventor: Robert J. Topper, Hatboro, Pa.

[73] Assignee: RCA Corporation, Princeton, N.J.

[21] Appl. No.: 853,855

[22] Filed: Apr. 21, 1986

[51] Int. Cl.⁴ .............................................. H04N 3/14
[52] U.S. Cl. .................................... 358/209; 358/225
[58] Field of Search ............... 358/209, 212, 213, 180, 358/225; 250/578

[56] References Cited

U.S. PATENT DOCUMENTS

| | | | |
|---|---|---|---|
| 3,893,174 | 7/1975 | Sano et al. | 358/65 |
| 4,439,788 | 3/1984 | Frame | 358/213 |
| 4,551,754 | 11/1985 | Meise et al. | 358/180 |
| 4,554,585 | 11/1985 | Carlson | 358/225 |

Primary Examiner—Gene Z. Rubinson
Assistant Examiner—Stephen Brinich
Attorney, Agent, or Firm—P. J. Rasmussen; P. M. Emanuel; R. G. Coalter

[57] ABSTRACT

A solid-state imager for a television camera which generates a compatible wide-screen signal, i.e., a wide-screen signal with compressed left and right edge portions for each television line. The solid-state imager includes photosensitive picture elements (pixels) which are nonuniformly distributed in each row of the imager in accordance with the amount of compression desired in the left and right edge portions of the signal.

17 Claims, 6 Drawing Figures

COMPATIBLE WIDE-SCREEN TELEVISION SYSTEM CAMERA

FIELD OF THE INVENTION

This invention relates to cameras for use in wide-screen television systems of the type in which compatibility with conventional television receivers is achieved by compressing or "squeezing" the edges of a wide-screen image.

BACKGROUND OF THE INVENTION

A conventional television receiver has a 4:3 image aspect ratio (the ratio of the width of the image to its height). Recently there has been interest in using wider image aspect ratios for television systems, such as 2:1 or 5:3, which more nearly approximate or equal the image aspect ratio of the human eye than does the conventional 4:3 aspect ratio. The 5:3 aspect ratio has received particular attention since release prints for motion picture film that use used this ratio can be transmitted and received in a 5:3 aspect ratio television system without cropping. However, wide-screen television systems which simply transmit signals having an increased aspect ratio as compared with conventional television systems are incompatible with conventional aspect ratio receivers. (As used herein, the term wide-screen means any image aspect ratio greater than the 4:3 aspect ratio used in conventional television displays.) It has been recognized by Meise et al. in their U.S. Pat. No. 4,551,754 entitled COMPATIBLE WIDE-SCREEN COLOR TELEVISION SYSTEM issued Nov. 5, 1985, that a wide-screen television signal may be made compatible with conventional television receivers by compressing or "squeezing" the left and right edges of the wide-screen image. When displayed on a conventional television receiver, the squeezed edges of the image are largely hidden from view due to receiver overscan. When displayed on a wide-screen receiver, the compressed edges are restored to their original width by means of time-expansion circuits included in the receiver.

In the Meise et al. system, picture edge squeezing is provided by modifying the horizontal deflection signal applied to the image pickup tube of the camera. In particular, additional horizontal rate deflection ramp generator circuits are used to modify the main horizontal rate deflection ramp generator output signal, so as to cause its ramp rate to increase in the vicinity of the edge portions of each horizontal line scan. This causes the image pickup tube to be scanned more quickly in the edge portions and results in readout from the pickup tube of a video signal representative of an image which is time-compressed at its edge portions. Meise et al. disclose image restoration ("de-squeezing") by means of a memory which stores the edge-squeezed video signal in response to a constant frequency write clock and recovers the stored signal in response to a variable frequency read clock. Changing the read clock frequency alters the relative timing of picture elements within the horizontal line, thereby facilitating expansion of the compressed edges of the displayed image.

To provide for display of both wide-screen and standard aspect ratio (i.e., 4:3) images, Meise et al. disclose a dual-mode receiver. In the Meise et al. system a coded signal is added to the vertical blanking interval of the compatible (edge-squeezed) wide-screen signal for identifying the signal as being representative of a wide-screen image. The coded signal is detected in the dual-mode receiver and used to control the display raster width and the time-expansion circuits. When the code is present, the time-expansion circuits are enabled and the raster width is expanded to the full width of a wide-screen kinescope. When standard television signals are received, the absence of the code is detected and used to reduce the raster width to provide a 4:3 aspect ratio and the time-expansion circuits are disabled (by-passed).

K. H. Powers in his U.S. patent application Ser. No. 504,374 filed June 14, 1983 as a continuation-in-part of application Ser. No. 485,446 filed April 14, 1983 (now U.S. Pat. No. 4,605,952, which issued Aug. 21, 1986), describes another example of a compatible wide-screen television system. In the Powers system, the center portion of the image is slightly compressed and the compression of the edges of the image ramps linearly to a factor of about 3:1 at the extreme edges. The camera in the Powers system includes CCD imagers which have an imaging area with a 5:3 aspect ratio. A wide-screen video signal is generated by clocking the imagers with clocking signals of uniform rate. Edge compression is provided by variable clock rate sampling of the wide-screen analog video signal provided by the CCD imagers. The sampling rate is varied by applying the output of a high frequency oscillator to a programmable divider having divisor coefficients stored in a programmable read only memory (ROM). The ROM is addressed by a counter that is clocked during each line interval, thereby changing the divisor coefficents and changing the sampling frequency during each line interval. This results in edge compression of the wide-screen video signal and generation of a wide-screen signal which is compatible with conventional aspect ratio television receivers.

It is recognized by the present inventor that a need exists for a compatible wide-screen television signal generator which does not require the use of auxiliary circuitry, such as additional ramp generators for modifying the pick-up tube deflection signals or high frequency and variable frequency oscillators, for providing edge compression of a wide-screen signal.

SUMMARY OF THE INVENTION

In accordance with the principles of the invention, a solid-state imager for a compatible wide-screen television camera includes photosensitive picture elements (pixels) which are distributed differently in left and right edge portions of each row of the imager as compared with the pixel distribution in a center portion of each row of the imager. The pixel distribution in the edge portions is in accordance with the amount of compression desired in the left and right edge portions of the image.

DESCRIPTION OF THE PREFERRED EMBODIMENTS

Figure 1:
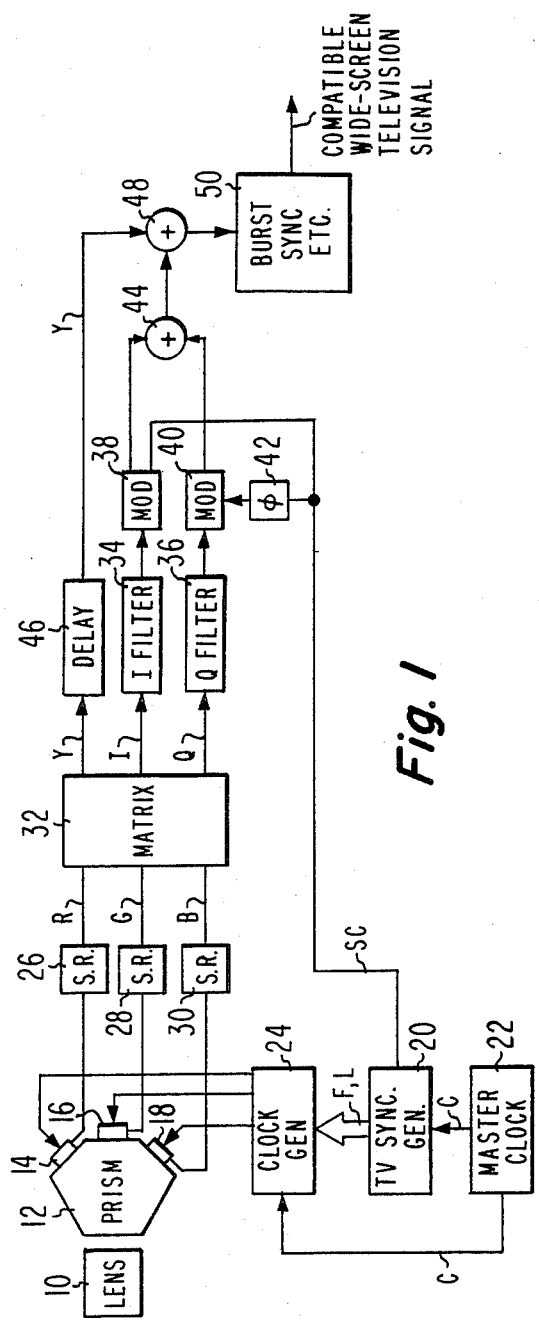
FIG. 1 illustrates, in block diagram form, a color television camera which generates a compatible wide-screen television signal in accordance with the invention.

FIG. 1 illustrates a color television camera including a lens 10 for directing radiant energy (such as visible light) from a scene onto the face of a color-separating prism 12. Prism 12 includes a combination of internally reflecting surfaces and/or absorptive filters for directing the incident light to individual red (R), green (G) and blue (B) solid-state imagers 14, 16 and 18. Solid-state imagers 14, 16 and 18 may comprise, for example, CCD imagers of the well-known frame-transfer type, such as illustrated in FIG. 2. A conventional television sync generator 20 is responsive to clock (C) signals from a master clock 22 for developing field (F) rate and line (L) rate signals as well known. The field rate and line rate signals are applied to an imager clock generator 24 along with the clock (C) signals from master clock 22 for developing conventional imager multi-phase clock signals which are applied to imagers 14, 16 and 18. As well known, in response to the multi-phase clock signals, imagers 14, 16 and 18 provide corresponding image-representative signals (and associated noise components) to signal recovery circuits 26, 28 and 30 for developing R, G and B color signals, respectively. Signal recovery circuits 26, 28 and 30 comprise one of the many well known noise reducing circuits which recover the signal supplied from a CCD imager, such as the well known correlated double sampling circuit The recovered R, G and B signals are applied to a color-encoding matrix 32 of conventional construction for converting the R, G and B color signals into Y, I and Q NTSC television signal components. The I and Q signals are applied through bandwidth-limiting I and Q filters 34 and 36 to individual amplitude modulators 38 and 40. Amplitude modulators 38 and 40 also receive respective quadrature phase related color subcarrier signals (SC) which are generated by TV sync generator 20 and a 90° phase shifter 42, for modulating in a known fashion the I and Q signals onto quadrature-phased color subcarriers. The modulated I and Q signals are added together by adder 44 and then summed with the luminance signal by adder 48 after it has been passed through an equalizing delay 46. A compatible composite wide-screen signal is generated at the output of adder 48 and is applied to block 50 wherein burst, synchronization (sync) and blanking signal components are inserted for producing the compatible wide-screen television signal. This signal may then be processed, such as by recording, or may be broadcast over the air waves or be transmitted via cable to television receivers.

Two types of receivers can be used for displaying the compatible wide-screen image; conventional 4:3 aspect ratio or special 5:3 aspect ratio receivers. The 5:3 aspect ratio receivers may be of the type described by Meise et al. (incorporated herein by reference) which display standard 4:3 aspect ratio images when compatible wide-screen signals are not being broadcast. As described more fully by Meise et al., the special wide-screen television receivers include complementary expansion circuits which restore the edge portions to their original widths so that 5:3 aspect ratio wide-screen images can be fully displayed without distortion.

In accordance with the principles of the invention, the time or edge compression which is required for developing the compatible wide-screen signal is not accomplished by additional signal processing circuits which must be added to the television camera, but is instead accomplished as a result of specially selected pixel distributions in the imaging portion of the solid-state imager, such as imagers 14, 16 and 18. Consequently, auxiliary signal processing or waveform modification circuits are not required Before discussing the solid-state imagers, it should be noted that the compatible wide-screen television signal is substantially the same as the conventional NTSC television signal except for the compression of the left and right image edge portions of the signal. A substantial portion of the squeezed left and right edges of the displayed image are hidden from view by the overscan. In an alternative embodiment to be described later, the amount of compression is progressively increased near the outer edges of the left and right edge portions of the image and it is these outermost edges of the left and right portions which are completely hidden from view by the overscan.

The normal "active" horizontal (H) scan time for a 525-line, 60 Hz television signal such as an NTSC television signal is about 53 $\mu S$, corresponding to the "4" portion of a 4:3 image aspect ratio. As used herein, the term "active" scan times refers to the picture representative portion of a line and excludes the blanking interval. The commensurate duration of the "5" portion of the 5:3 aspect ratio would be 5/4 times 53 microseconds or about 66 microseconds if edge compression were not used. It is desirable that about 40 microseconds at the center of the active portions of each horizontal line remains unchanged when making the compatible wide-screen signal. Thus, the video remaining in the 5:3 aspect ratio image which is outside of the 40 microsecond central portion is 66 $\mu S - 40$ $\mu S = 26$ $\mu S$ of effective video, while with the 4:3 aspect ratio there is 53 $\mu S - 40$ $\mu S = 13$ $\mu S$ of effective video available to convey the compressed edge information. Consequently, 26 $\mu S$ of effective time duration of the 5:3 aspect ratio video must be compressed into 13 $\mu S$ to be compatible with the 4:3 aspect ratio displays. This can be accomplished with a time or image compression of 2:1 at the right and left extremes of the image.

Figure 2B:
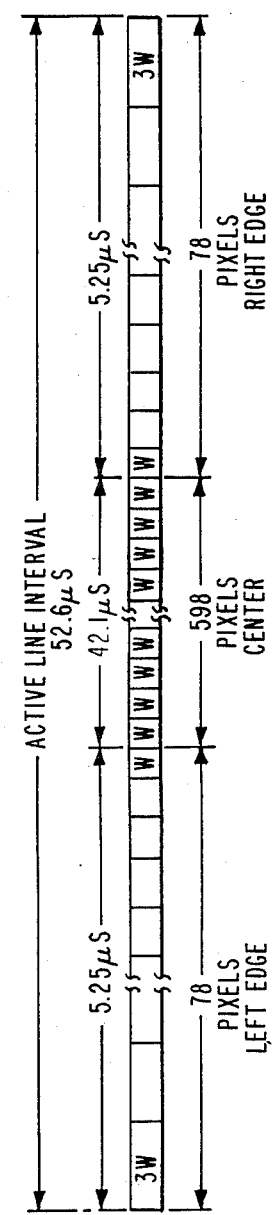
FIGS. 2a and 2b illustrate details of a solid-state imager constructed in accordance with the invention, which is included in the television camera of FIG. 1.
Figure 2A:
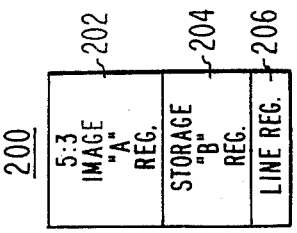

FIG. 2a illustrates a solid-state imager 200 which is representative of one of the solid-state imagers 14, 16 or 18 used in the television camera of FIG. 1. As previously noted, imager 200 is a CCD imager of the frame-transfer type. Imager 200 includes an imaging or "A" register 202 comprising an array of photosensitive elements (pixels) arranged in rows and columns. The imaging area of the "A" register 202 has a 5:3 aspect ratio. During an integration time interval, corresponding to about 1/60th of a second in the NTSC television system, the pixel array of "A" register 202 develops an image-representative charge pattern in response to the incident radiant energy. At the end of the integration interval, i.e., during the vertical blanking interval, the charge pattern is transferred to a storage or "B" register 204. During the following integration time interval, "A" register 202 develops the next image-representative charge pattern while the pattern of charges stored in "B" register 204 are read out from imager 200 one row at a time at the horizontal line rate, by a line register 206.

Although the aspect ratio of "A" register 202 is 5:3, the signal supplied by line register 206 has compressed left and right image portions to form a compatible widescreen signal. This is accomplished, according to the invention, by changing the distribution of the photosensitive pixels along each row of "A" register 202. One example of a pixel distribution in accordance with the invention is illustrated by FIG. 2b, which shows one row of pixels from the pixel array of "A" register 202.

Assuming a pixel clock rate of 4 times the NTSC color subcarrier, i.e., 14.3 MHz, there are 910 pixels per horizontal line time (63.5 μS). Of these 910 pixels, 156 occur during the vertical blanking interval (10.9 μS), leaving 754 pixels for the active video time interval (52.6 μS). In the forenoted Meise et al. patent, the compatible wide-screen signal is generated from a 5:3 aspect ratio signal by 2:1 compression of its left and right edge portions (each edge portion being 20% of each line time in the wide-screen signal). The result is that each edge portion of the compatible wide-screen signal comprises about 10% of the active picture interval (i.e., 5.25 μS) leaving 80% of the active picture interval (42.1 μS) for the unchanged center portion of the active picture interval. These time intervals are illustrated on the row of pixels shown in FIG. 2b, wherein each edge portion comprises 78 pixels and the center portion comprises 598 pixels. For the sake of clarity in FIG. 2b (and FIG. 4), only a representative amount of pixels are actually illustrated.

As illustrated in FIG. 2b, each pixel in the center portion of a row is of uniform width W, however, the width of the pixels in each edge portion increases uniformly and linearly, from W for the pixel nearest the center portion, to 3W for the pixel at the outermost edges of the row. Since each pixel is read out of CCD imager 200 at a constant rate, i.e., 14.3 MHz, the edge portions of each television line will be time-compressed depending upon the average increase in width of its pixels. The pixel width changes linearly from W to 3W, the average width being 2W, resulting in a 2:1 time compression of each edge portion. Since the pixel widths are uniformly varied throughout the edge portions, time compression is achieved in a gradual manner. Thus, the generation of a vertical line near the left and right extremes of a 4:3 aspect ratio receiver displaying the compatible wide-screen image, which would occur if the change in pixel width was sudden, is avoided. In other words, the gradual change in pixel width blends the compressed edges with the uncompressed center to thereby minimize the visibility of compressed to uncompressed image transition regions.

Since in edge-squeezed systems there are less pixels per unit of distance in the edge portions of the image, as compared to the number of pixels per unit of distance in the center portion of the image, the image in the edge portions has a tendency to alias (for some images) while the center portion will not alias. In the prior art, aliasing is conventionally prevented by optical lowpass filtering of the image before it reaches the imager so as to reduce those spatial components of the image which would result in aliasing. However, the conventional prior art approach is difficult to achieve in the prior art compatible wide-screen television camera system, such as the forenoted U.S. patent issued to Meise et al., since the optical filtering characteristics of the optical filter must be spatially distributed across the image so as to lowpass filter the image in the edge portions without filtering (and thereby unnecessarily reducing the resolution) in the center portion.

In the FIG. 2b embodiment of the invention, optical lowpass filtering in the edge portions is advantageously and effectively provided by the increased width of the pixels in the edge portions. The increased width lowers the imaging resolution in the edge portions, resulting in reduced tendency to alias just the same as if the edge portions where optically filtered.

Figure 3:
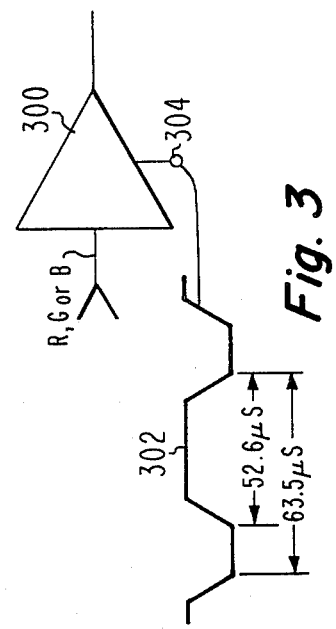
FIG. 3 illustrates a gain control arrangement useful for understanding the operation of the television camera of FIG. 1 when imagers of the type illustrated in FIG. 2b are used.

Since the pixels in the edge portions of FIG. 2b have a large surface area, they will develop proportionately larger amplitude signal levels than the pixels in the center portion, for equal amounts of received radiant energy. This effect may be compensated for, in accordance with a feature of the invention, by applying a nonlinear horizontal rate gain-control signal to an amplifier included in each of the video signal processing paths of the television camera of FIG. 1. FIG. 3 illustrates such a gain controlled amplifier 300 which is included (but not shown) in each of the signal recovery circuits 26, 28 and 30 of FIG. 1. A horizontal rate gain-controlled signal 302 is applied to a gain-control input 304 of amplifier 300 so as to compensate for the horizontal rate variation in the R, G and B signal amplitudes caused by the changing surface area of the pixels across each row of imager 200. The amplitude of gain-control signal 302 linearly decreases during the edge portions of each television line, thereby decreasing the gain of amplifier 300 so as to precisely compensate for the increased gain of the larger pixels in the edge portions of the image.

Figure 4:
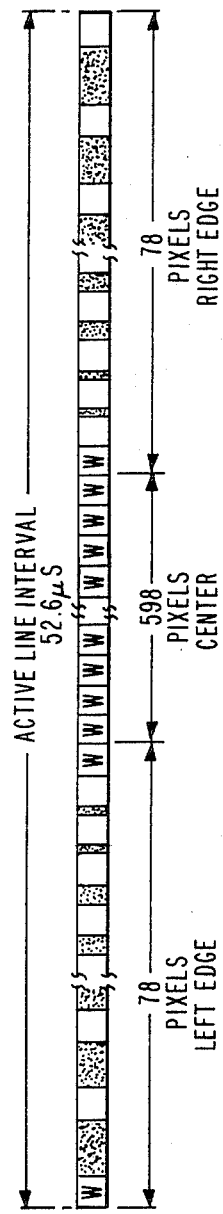
FIG. 4 illustrates, in block diagram form, an alternative pixel distribution arrangement for the solid-state imagers used in the television camera of FIG. 1.

FIG. 4 illustrates an alternative embodiment of the invention wherein the pixel distribution is uniformly and linearly changed in the edge portions by the same amount as in the FIG. 2b embodiment, however, the surface area of each pixel is constant and has the same area as the pixels in the center portion. This is accomplished, as illustrated in FIG. 4, by providing an increased spacing between adjacent constant area pixels in the edge portions (the spaces are shaded), the spacing increasing linearly as a function of the distance of each pixel from the center portion. Since in this embodiment each pixel has the same surface area, and hence generates the same amount of charge for a given amount of radiant energy, a gain compensation arrangement such as shown by FIG. 3 is not required.

Figure 5:
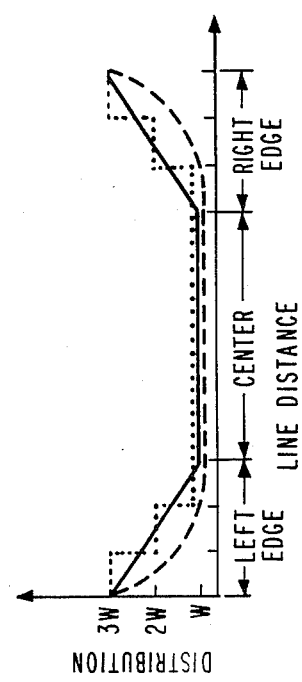
FIG. 5 is a graphical representation of alternative imager pixel distributions in accordance with the invention.

Although uniform and linear changes in pixel element distribution have been illustrated by FIGS. 2b and 4 for the left and right edge portions of the imager for providing the image compression, it should be clear that other types of pixel distributions would result in image compression. FIG. 5 is a graphical representation of pixel distribution (spacing or width) plotted as a function of line lengths (or line time). The solid line illustrates the linear distribution function of FIG. 4. The dashed line illustrates a uniform exponential distribution function and the dotted line illustrates a nonuniform (i.e., discontinuous) distribution function with linearly increasing steps of W, 2W and 3W. The exponential pixel distribution provides its greatest amount of compression at the outermost edges of the left and right portions of the image, these outermost edges being completely hidden from view by the overscan.

Furthermore, although the television camera system of the preferred embodiment has been described in the context of the NTSC television system it should be clear to those skilled in the art that the principles of the invention are equally applicable to television camera systems in accordance with the PAL or SECAM standards. Furthermore, although the solid-state imager is illustrated as being of the CCD frame-transfer type, it should be clear that solid-state imagers other than CCD imagers and other than the frame-transfer type can also be arranged in accordance with the present invention, such as MOS X-Y addressed imagers or CCD imagers of the interline or horizontal line transfer type.

What is claimed is:

1. Apparatus for generating a compatible wide-screen television signal comprising:
   a solid-state imager including an array of photosensitive picture elements (pixels) arranged in rows and columns for developing an image-representative charge pattern in reponse to incident radiation, wherein the pixel distribution in a center portion of each row of said array is constant and a pixel distribution in the left and right edge portions of each row of said array is different from said pixel distribution in said center portion; and wherein
   said center portion of each said row includes a greater number of pixels than said edge portions.

2. Apparatus for generating a compatible wide-screen television signal, comprising:
   a solid-state imager including an array of photosensitive picture elements (pixels) arranged in rows and columns for developing an image-representative charge pattern in response to incident radiation, wherein the pixel distribution in a center portion of each row of said array is constant and a pixel distribution in left and right edge portions of each row of said array is different from said pixel distribution in said center portion; and wherein:
   the surface area of all the pixels in each row of said array is substantially constant; and
   the pixel distribution in the left and right edge portions of each row of said array includes increased spacing between adjacent pixels which are further from the center portion of each row of said array.

3. Apparatus according to claim 2 wherein:
   said solid-state imager includes a CCD imaging array 4. Apparatus according to claim 2 wherein:
   said spacing between adjacent pixels increases as a predetermined function of the distance of the adjacent pixels from the center portion of each row of said array.

5. Apparatus according to claim 4 wherein:
   said predetermined function is a linear function.

6. Apparatus according to claim 4 wherein:
   said predetermined function is an exponential function.

7. Apparatus according to claim 4 wherein:
   said predetermined function is a discrete stepwise function in which pixels of each edge portion are arranged in at least two groups and in which the spacing between pixels of an outermost one of said groups is greater than the spacing between pixels of an innermost one of said groups.

8. Apparatus for generating a compatible wide-screen television signal, comprising:
   a solid-state imager including an array of photosensitive picture elements (pixels) arranged in rows and columns for developing an image-representative charge pattern in response to incident radiation, wherein the pixel distribution in a center portion of each row of said array is constant and a pixel distribution in left and right edge portions of each row of said array is different from said pixel distribution in said center portion; and wherein:
   the width of adjacent pixels in the left and right edge portions of each row of said array increases as a predetermined function of the distance of each of said adjacent pixels from the center portion of each row of said array.

9. Apparatus according to claim 8 wherein:
   said solid-state imager includes a CCD imaging array.

10. Apparatus according to claim 8 wherein:
    said predetermined function is a linear function.

11. Apparatus according to claim 8 wherein:
    said predetermined function is an exponential function.

12. Apparatus according to claim 8 wherein:
    said predetermined function is a discrete stepwise function in which pixels of each edge portion are arranged in at least two groups and in which the pixels of a first one of said groups are each of a given width and the pixels of a second one of said groups are each of a width greater than said given width.

13. A television camera for producing a compatible wide-screen television signal comprising:
    a solid-state imager including an array of photosensitive picture elements (pixels) arranged in rows and columns for developing an image-representative charge pattern in response to incident radiation, wherein a pixel distribution in a center portion of each row of said array is constant and a pixel distribution in left and right edge portions of each row of said array is different from said pixel distribution in said center portion, and wherein
    said center portion of each row includes a greater number of pixels than said edge portions;
    means coupled to said imager and causing readout at a uniform rate of said image-representative charge pattern from the pixels of each row of said array for developing an imager output signal; and
    signal processing means responsive to said imager output signal for developing said compatible wide-screen television signal.

14. A television camera for producing a compatible wide-screen television signal, comprising:
    a solid-state imager including an array of photosensitive picture elements (pixels) arranged in rows and columns for developing an image-representative charge pattern in response to incident radiation, wherein the pixel distribution in a center portion of each row of said array is constant and a pixel distribution in left and right edge portions of each row of said array is different from said pixel distribution in said center portion;
    means coupled to said imager and causing readout at a uniform rate of said image-representative charge pattern from the pixels of each row of said array for developing an imager output signal;
    signal processing means responsive to said imager output signal for developing said compatible wide-screen television signal; and wherein:
    the surface area of all the pixels in each row of said array is substantially constant; and
    the pixel distribution in the left and right edge portions portions of each row of said array includes increased spacing between adjacent pixels which are further from the center portion of each row of said array.

15. A television camera according to claim 14 wherein:

said solid-state imager includes a CCD imaging array.

16. A television camera for providing a compatible wide-screen signal, comprising:

a solid-state imager including an array of photosensitive picture elements (pixels) arranged in rows and columns for developing an image-representative charge pattern in response to incident radiation, wherein the pixel distribution in a center portion of each row of said array is constant and a pixel distribution in left and right edge portions of each row of said array is different from said pixel distribution in said center portion;

means coupled to said imager and causing readout at a uniform rate of said image-representative charge pattern from the pixels of each row of said array for developing an imager output signal;

signal processing means responsive to said imager output signal for developing said compatible wide-screen television signal; and wherein:

the width of adjacent pixels in the left and right edge portions of each row of said array increases in accordance with the distance of each of said adjacent pixels from the center portion of each row of said array.

17. A television camera according to claim 16 wherein:

said signal processing means includes a gain controlled signal amplifier having its gain controlled at the row readout rate in a manner complementary to the change in width of said pixels across each row of said array.

* * * * *